Figure 7:
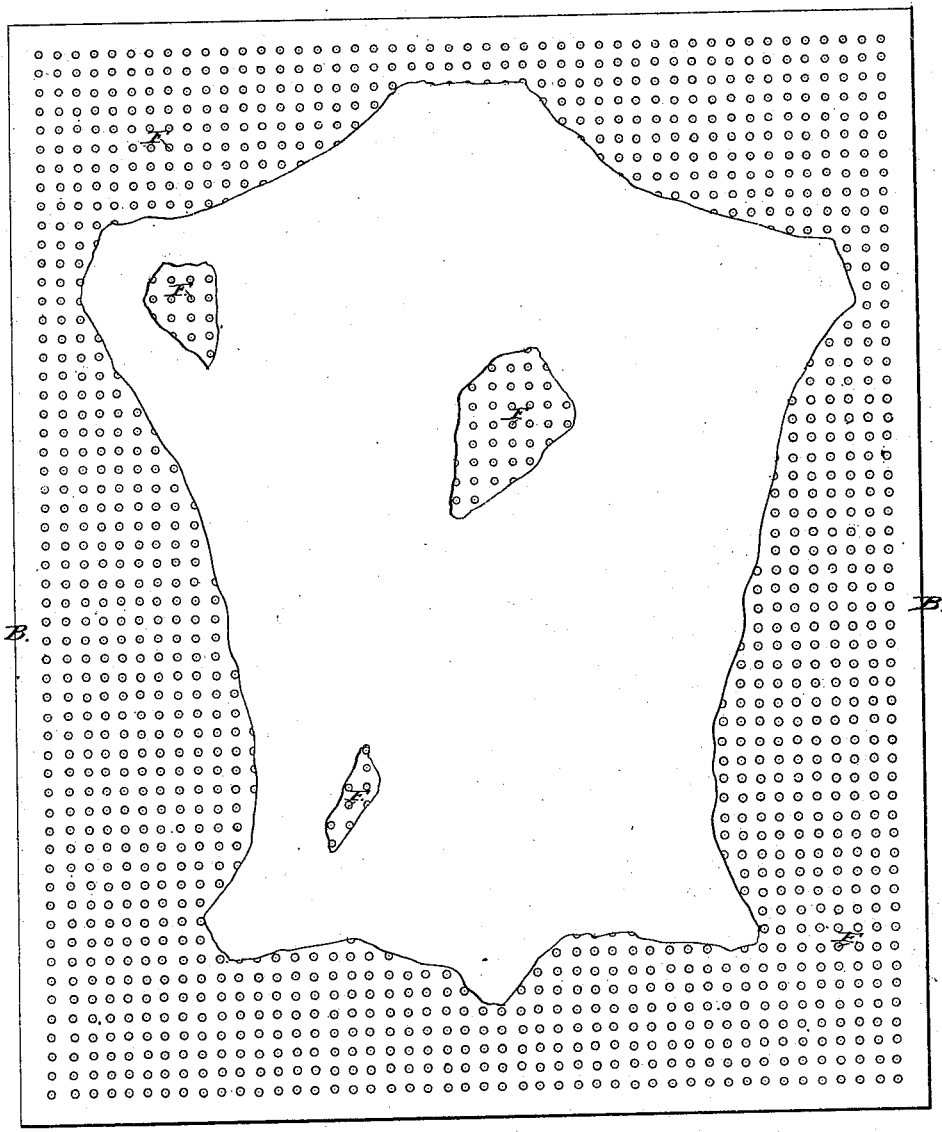

4 Sheets—Sheet 1.
D. T. WINTER.
Device for Measuring and Weighing Skins.
No. 208,942. Patented Oct. 15, 1878.
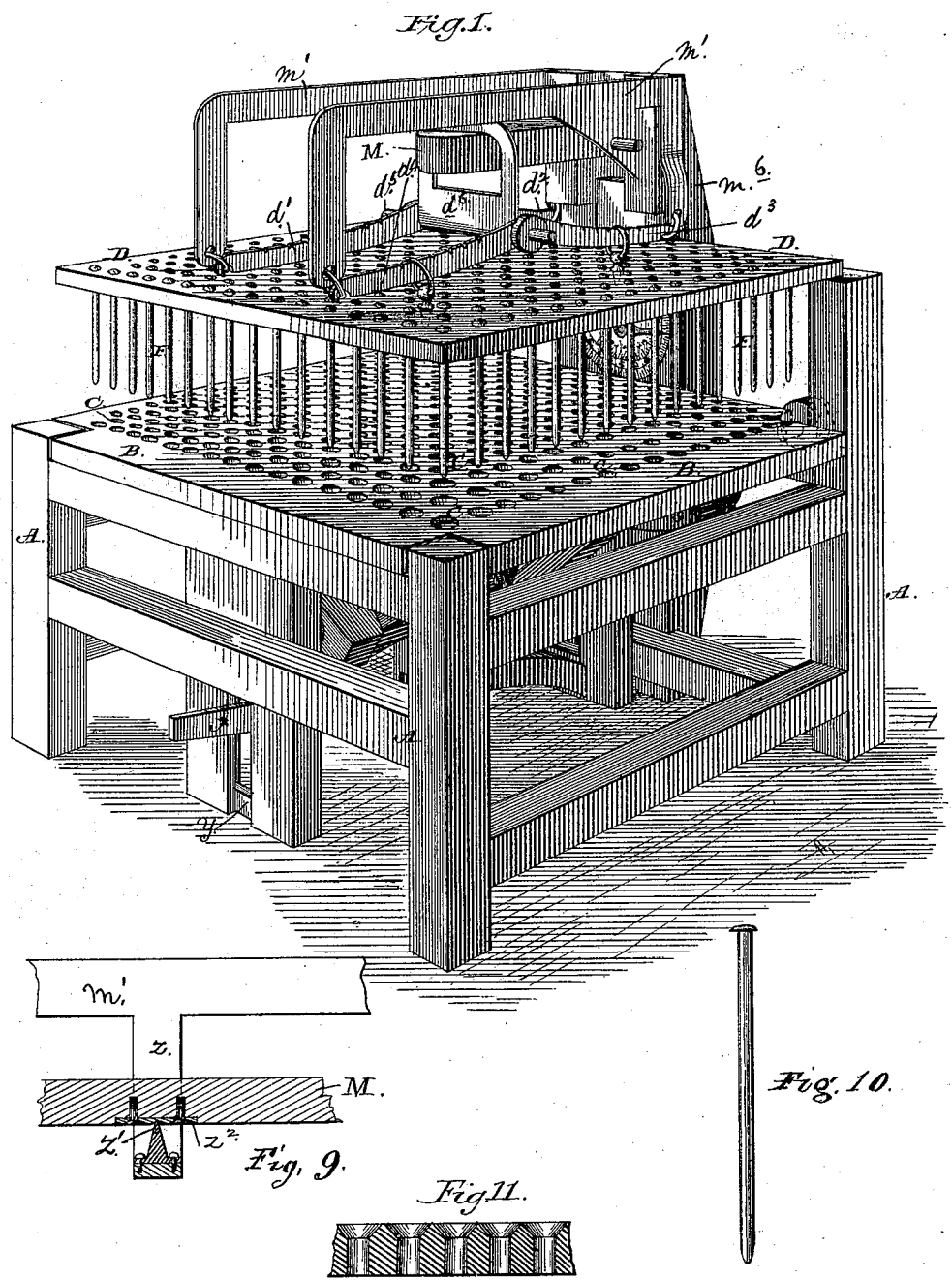
WITNESSES
John A. Ellis
Penn Halsted
INVENTOR
David T. Winter
by John J. Halsted
his ATTORNEY 4 Sheets—Sheet 2.
D. T. WINTER.
Device for Measuring and Weighing Skins.
No. 208,942.      Patented Oct. 15, 1878.
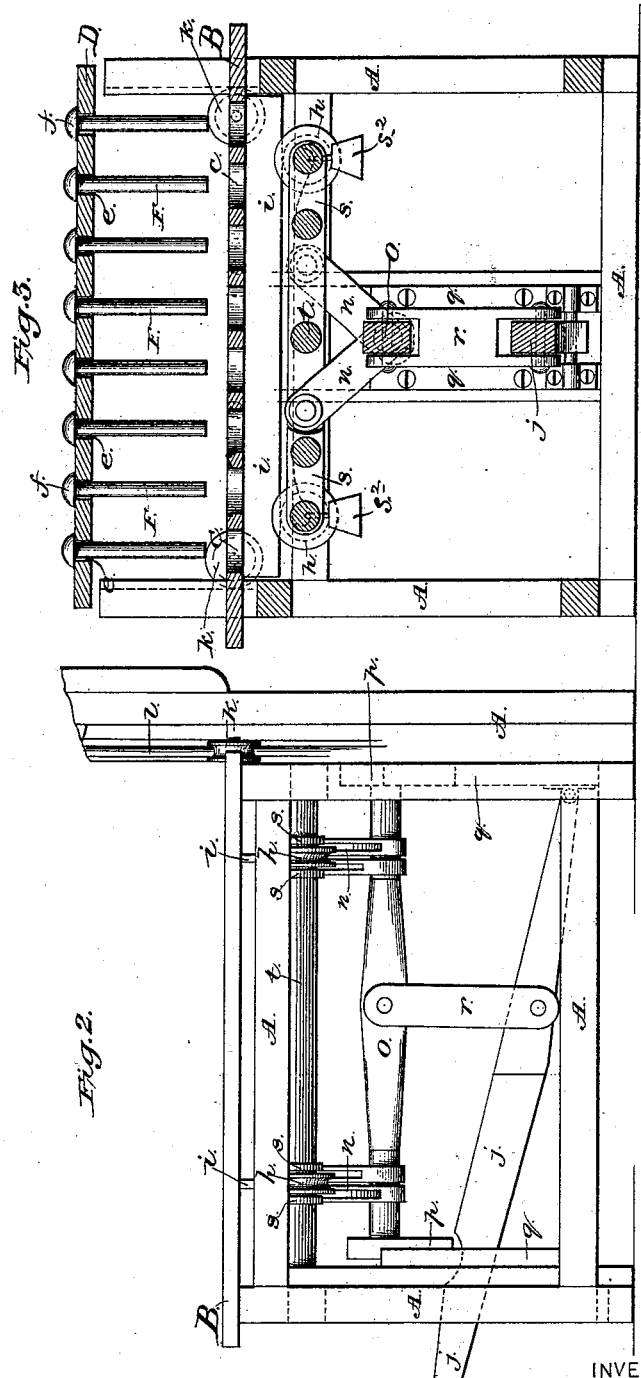
WITNESSES
John A. Ellis
Penn H. Alsted
INVENTOR
David T. Winter
by John J. Halsted
his ATTORNEY 4 Sheets—Sheet 3.
D. T. WINTER.
Device for Measuring and Weighing Skins.
No. 208,942.      Patented Oct. 15, 1878.
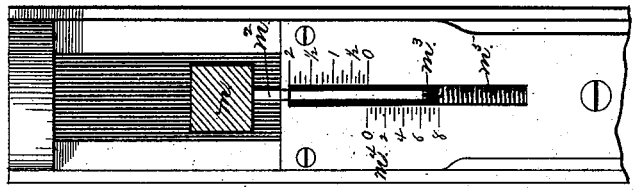
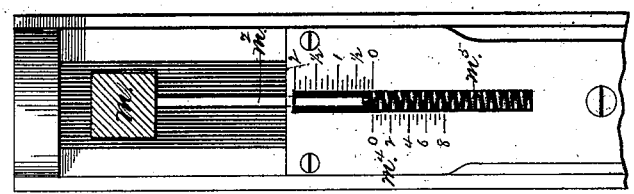
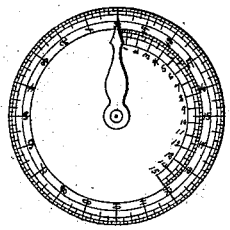
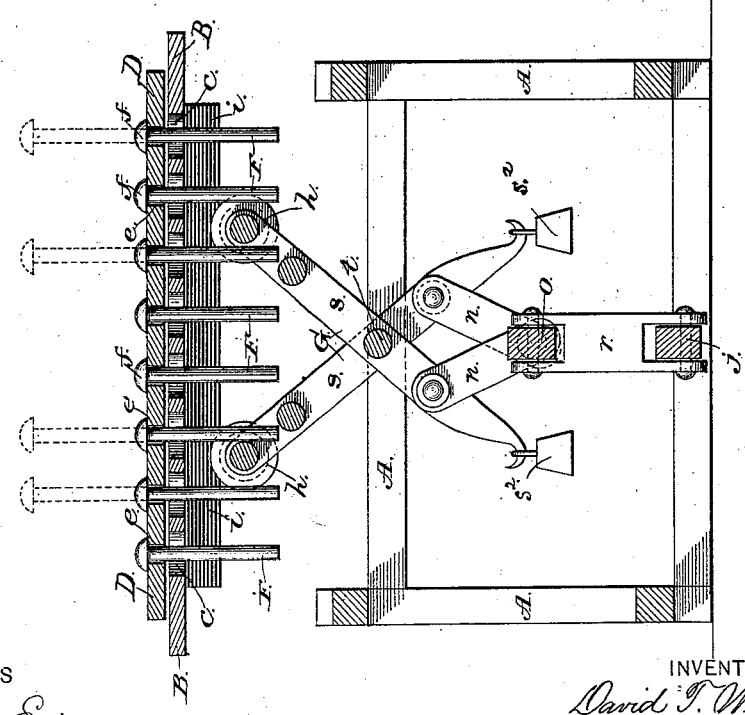
WITNESSES
INVENTOR
David T. Winter
by John J. Halsted
his ATTORNEY 4 Sheets—Sheet 4.

D. T. WINTER.
Device for Measuring and Weighing Skins.

No. 208,942. Patented Oct. 15, 1878.

WITNESSES
John A. Ellis.
Penn Halsted

INVENTOR
David T. Winter
by John J. Halsted
his ATTORNEY.

UNITED STATES PATENT OFFICE.

DAVID T. WINTER, OF PEABODY, MASSACHUSETTS, ASSIGNOR OF ONE-HALF INTEREST TO CHAS. E. TEAGUE, OF SAME PLACE.

IMPROVEMENT IN DEVICES FOR MEASURING AND WEIGHING SKINS.

Specification forming part of Letters Patent No. 208,942, dated October 15, 1878; application filed June 24, 1878.

*To all whom it may concern:*

Be it known that I, DAVID THOMAS WINTER, of Peabody, in the county of Essex and State of Massachusetts, have invented certain new and useful Improvements in Machines for Measuring the Area or Surface of Skins and other articles having irregular edges, and which improvements are also adapted for weighing the skins, &c.; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of my invention is to furnish an improved and practically-successful machine, whereby the superficial or surface measurement of skins and other similar articles having irregular edges may be speedily ascertained, and without needing to make any hand-measurements or any nice arithmetical or geometrical calculations, and requiring no peculiar skill or mathematical knowledge in using it, and one also which will give a quicker and more accurate measurement than is usually obtained of such articles whether attempted by hand or by mechanism, more especially when there are holes in the body of the same, as is often the case with skins, and which is also adapted for readily weighing and indicating the weight of skins singly, or by the dozen, or otherwise.

Figure 1 is a perspective view of a machine illustrating my invention; Fig. 2, a side elevation of table and parts beneath it; Fig. 3, a cross-section in part, the pins and their holes being somewhat larger. Fig. 4 shows the position of the parts when the table is raised; Figs. 5 and 6, modifications of the measuring-scale; Fig. 7, a diagram illustrating the action of the surface of a skin upon the pins; Fig. 8, a plan of the curved or circular dial-plate; Fig. 9, a modified means for hanging the scale-lever; Fig. 10, a pin detached; and Fig. 11, a fragmentary vertical section of the lower table, showing the countersinks close together.

A is the frame of the machine; B, an under table, having a series of similar holes, C, arranged as close to each other as possible consistent with preserving the integrity of the table, and in straight parallel lines, and at equal distances from each other; and D an upper table, having a corresponding number of smaller holes, e, correspondingly arranged. In a full-sized machine, supposing the tables to have each an area of, say, twenty (20) square feet, I make about two hundred and fifty-six (256) holes for each square foot, or sixty-four (64) for each one-fourth ($\frac{1}{4}$) foot square, making altogether five thousand one hundred and twenty (5,120) holes in each of the tables, the smaller holes of the upper table being severally directly over the centers of the larger holes in the under table. I find in practice that an eighth ($\frac{1}{8}$) of an inch in diameter is a good size for the upper holes, and a half ($\frac{1}{2}$) inch diameter for the under ones, and the distance between the centers of the holes is about three-fourths ($\frac{3}{4}$) of an inch.

In each of the holes of the upper table I hang a long pin, F, suspended only by its head or flange *f*, the shank of the pin being enough smaller than the hole to permit it to be moved up and down freely therein without effort or friction, the head, of course, serving to prevent its dropping through. The pins are all of uniform length and weight, and preferably of uniform size; and, in practice, I find the machine to work satisfactorily by making them one hundred and twenty-eight (128) to the pound and two pounds to the square foot, thus employing two hundred and fifty-six (256) pins to the square foot, and I find three (3) inches a satisfactory length. The pins may be somewhat pointed or reduced at their tip, if desired, to insure their entering the larger holes with unerring certainty; but, practically, I have not found this needed, and the holes in the lower table are, preferably, countersunk, as shown, and for the same purpose. The holes of the lower table being thus so much larger than the pins, they are permitted to drop freely through them without any objectionable contact or obstruction from such table when the latter is lifted above the plane or level to which their lower ends reach.

The lower table is supported on two or more sets of compound levers or lazy-tongs, G, and which may be provided with grooved friction-rollers $h$, running on guideways or tracks $i$ on the under side of the table; and the table is lifted, when desired, by means of a treadle or lever, J. It is also preferably provided with friction guide-rollers $k$, running on vertical guides on the frame, and which devices assist in steadying the table in its movements up and down.

The lower arms or members, $n$, of the lazy-tongs are supported by and turn on a horizontal bar or shaft, O, extending across the frame-work, and the ends of this shaft are supported in sliding blocks $p$ $p$, which are free to be moved up and down in vertical guide-ways $q$ $q$. A bar, $r$, serves as the connection between the center of the shaft O and the treadle or foot lever J, and the pressing down of this treadle thus pulls down the shaft and the arms $n$ of the compound levers or lazy-tongs, and lifts the table by elevating and drawing toward each other the upper members, $s$ $s$, of said levers, which are centered on a fixed bar or shaft, $t$, extending across the frame. The shafts O and $t$ lend their aid in giving a true vertical movement to the lower table.

The pendent upper table, D, is hung on four levers, $d^1$ $d^2$ $d^3$ $d^4$, each of which, at its inner end, is fulcrumed on a horizontal rod, $d^5$, supported by a plate or pendant, $d^6$, from a lever, M, which is centered on a frame or hangers, $m^1$, the outer ends of these four levers being respectively hung, as shown, at fixed points on the hangers $m^1$, or on the frame, or both. This mode of hanging insures a horizontal and true position to the table D, whether all, or part, or any part, of the pins be lifted, thus avoiding any tipping of such table by reason of more pins being lifted at one side or portion than at another.

The rear end of the lever M is connected to a rod, $m^2$, having at its lower end a pin, which operates a vibrating indicator or pointer, $m^3$, for which is provided a graduated scale, as shown in Figs. 1 and 8. This scale is graduated in both directions from its zero-point. The scale in one direction—i. e., upward from or at one side of zero—indicating, in a full-sized working machine, the area or measurement of a skin, &c., in square feet, or in multiples or divisions thereof to the smallest fraction; and the scale in the other direction, or below the zero-point, indicating the weight of skins in pounds or fractions of pounds when the apparatus is used for weighing. The same pointer thus answers for both scales. One of these scales may be indicated on an arc or circle of greater circumference than the other, and, if desired, either, or especially the one indicating size, may extend around the greater part of a circle; but usually the indicator for measure would travel about twice as far for one foot of measurement as it would for one pound of weight, because two pounds in weight of pins represent, as before mentioned, a square foot of superficial measure.

The rod $m^2$ is connected to a coiled spring, $m^5$, tending not only to pull down the rear arm of lever M, and thus to hold the upper table and its pins sufficiently above the lower table—say, two feet—to leave ample room for the introduction of the skin in placing it on the lower table, but also at the same time leaving the index-pointer at the zero-point.

The levers $d^1$ $d^2$ $d^3$ $d^4$ should each be notched for a short distance on its upper edge, as shown, to permit the links or hooks which support the upper table to be held to the proper positions to give the table its proper horizontal position, and to allow for any needed shifting of such links or hooks to adjust the table, in case this position should be disturbed by accident or carelessness. Under ordinary circumstances, however, when properly hung in the beginning, the table will need no further adjustment.

The upper members, $s$, of the lazy-tongs project beyond their fulcrum or axis, and are weighted, as shown at $s^2$, so as to afford a counterpoise or balance to its opposite or roller end sufficient to relieve the operator to a great extent in lifting the lower table. The effect of this counterpoise, in practice, is that, notwithstanding the size of the working machine and the weight of the devices to be lifted, the whole is operated with great facility and quickness, and may be managed by boys or children, at the same time that the weight or measurement may be accurately ascertained and noted by any person of ordinary capacity, and as rapidly as the skins can be put on and removed from the table, so that thousands of skins can be measured or weighed in a day on a single machine.

For weighing, the same apparatus is applicable under my mode of construction. When any number of skins have been measured, each, of course, singly, one after the other, they may be taken by the dozen, or in any number, and laid like a bundle on the upper table, D, and between the hangers $m^1$, which, in a full-sized working machine, afford ample space for this purpose, both at their sides and between them, and instantly their weight carries down this table and its pins, thus causing the index or pointer to move to the other side of the zero-point of the scale, and this weight-indicating scale is graduated for pounds and divisions and subdivisions of pounds.

Beneath the treadle may be placed any pin or other obstacle, $y$, to serve as a stop to its downward motion, for the purpose of limiting the rising of the under table, as it need only be raised enough to insure the lifting from the upper table of the pins actuated by the skin. The practical effect of this stop, it will now be seen, is threefold—viz., first, it prevents the lower table being lifted needlessly high after the pins on which the skin acts have been raised sufficiently to indicate the size of the skin; secondly, it avoids any risk of the highest points of a crumpled skin being raised enough to come in contact with the under side of the table, and thus raise it unduly, and compel thereby an incorrect measurement; and, thirdly, it saves any useless waste of power and time on the part of the operator, which is very important in a machine of this character having so many weights to be lifted, and to relieve which, in part, I have introduced the counterpoise-weights $s^2$, hereinbefore mentioned.

In Fig. 9 the scale-lever M is shown as balanced on a pendant, $z$, hung from the hanger $m^1$, this pendant having a plate with a sharp or knife-like edge, $z^1$, on which rests a metal plate, $z^2$, secured to the under side of the lever M. The plate $z^2$ should have a slight groove, to admit the edge of the edge $z^1$. In the working machines I prefer to hang the lever in this manner, as it admits of a more ready and more free and accurate movement, and a nicer indication on the scale.

The machine being in the position as to its working parts as shown in Fig. 1, and the skin to be measured placed upon the lower table, and the latter lifted by pressing the foot upon the treadle, the skin will lift all such pins as rest upon it, and no others. Hence the upper table is consequently relieved of the weight of all such lifted pins, and which weight is then sustained by the lower table. The power of the spring $m^5$ now comes actively into play, and moves the pointer on the scale a distance precisely proportionate to the weight of the lifted pins, the area of the skin, whatever may be its shape or irregularities, determining the number of pins so lifted—say, two hundred and fifty-six (256) to the square foot of skin—and the weight of such lifted pins determining the distance that the pointer moves, and which is at once visible on the scale. The whole action is thus prompt and simple, the result reliable, and no calculations or reckoning needed.

It will also be observed that the operator not only avoids the time, trouble, and ordinary errors of calculations, but that the measurements are not likely to be incorrect and fluctuating, as is the case in the usual mode of measurement because of his variable states of physical or mental weariness or nervousness; and that my invention will, to a great degree, do away with the disputes that are constantly arising between the manufacturer and purchasers, owing to alleged erroneous measurements.

The holes and pins in my machine, as before stated, should be placed as near together as practicable; and this is of vital importance, as it leaves the least possible portion of the area of the skin untouched by the pins, and consequently all the variation from absolute geometric measurement of such area must therefore be found in small portions only of the outside edges or of the edges of the holes; and as these variations would be sometimes slightly over and sometimes slightly less, they practically equalize each other.

The pins are preferably made long—say, about three (3) inches—to insure a lifting by the skin of all the pins within the space of its area. Frequently skins will be a little stiff and uneven, and more or less wavy on the surface. If the pins were quite short, those only would be acted upon which could come into contact with the higher parts of the skin, and the measurement indicated in such case must be very erroneous; but by making them of a length such as to meet the extremest elevations or undulations of a crumpled skin, so that all the pins above the skin shall be lifted when the table is raised, no pin will fail to do its duty.

This length of pin has another advantage—that it may be materially reduced in its diameter, and be made very much lighter, and yet have sufficient weight; and this reduction in diameter permits them to be placed all the more closely together. The closer they are, the closer the measurements; and the closer they are, the more will they tend to level the uneven skin, and thereby make the measurements more exact, both throughout the surface and also at the edges.

It will be evident that the lower table may be elevated by other mechanism than the compound levers or lazy-tongs so long as it be arranged to rise up and down in or on appropriate steadying-guides.

In a full-sized machine there are about two feet clear space between the bottoms of the pins and the top of the lower table, thus giving ample room for the workman to introduce and remove quickly the articles to be measured, and the skins can be measured or weighed and removed as fast as a workman can put them in and out.

In the modification shown in Figs. 5 and 6, the vibrating pointer is omitted, and the rod $m^2$ at its lower end forms a pointer, a straight scale being provided for it, as seen in those figures; but I prefer the vibrating pointer because of its leverage, which permits its outer tip to describe the arc of a large circle, and thus to admit of a more minute division and subdivision of the scale.

In a full-sized machine the circular graduated scale would be central, extending both sides of the upright $m^6$, and the height of the machine is such that the operator readily reads the indicated measurement at a glance, looking under the lower table just before the same is let down. By employing a foot-treadle, both hands of the operator are left free for manipulating the skins with rapidity.

By sustaining the upper table on the system of equal and equalized levers supported at both ends, perfect certainty of its horizontal position under all its movements is insured.

By countersinking the holes of the lower table they are efficient for the admission of the pins at closer proximity to each other than if not so countersunk.

I am aware that perforated tables and short headed pins have been employed, the tables having their holes at very considerable distances from each other, and the upper table being hung from a single central point of suspension. These, therefore, I do not claim.

I am also aware that it has been attempted to give the skin a downward movement against the tops of pins upheld by springs, and having weights hung to their lower ends, but which weights and springs preclude the placing of the pins in close proximity to each other, and also add greatly to the cost and weight of the machine. Such a construction I do not claim.

I claim—

1. In combination, the foot-treadle, a stop for limiting its downward movement, and likewise the consequent upward movement of the table, the perforated lifting-table B and its guide-rollers, and the adjustable upper table D, the table being closely perforated, as and for the purposes described.

2. The lower table, B, provided with guide tracks or ways $i$, in combination with the treadle, and with the compound levers or lazy-tongs $s\ s\ n\ n$ and weights $s^2$, substantially as shown and described.

3. The suspended perforated table D in combination with its supporting-levers $d^1\ d^2\ d^3\ d^4$, suspended rod or axis $d^5$, and hangers $m^1$, substantially as shown and described.

4. The combination of the upper table, D, its described system of supporting-levers, the lever M, registering index or pointer, and its down-pulling spring $m^5$, substantially as shown and described.

5. In combination, the system of long thin pins placed closely together, as described, the table B, having the described system of countersunk holes, the countersinks merging nearly or quite into each other, and the suspended table D, adjustably hung and balanced on the compound system of levers $d^1\ d^2\ d^3\ d^4$, as shown and described.

6. In combination with the table D, hung and balanced horizontally, as described, and with the hangers $m^1$, a double scale, one for size and one for weight, and a single indicator for both scales, and whereby, without any change or adjustments of the mechanism, the skins, after being singly measured, may be weighed in lots by the same machine, and the weight of such lots indicated by the same pointer or index, substantially as shown and described.

7. The machine described and shown, consisting of the following parts, in combination, namely: the under table, B, its weighted levers, foot-treadle, and stop $y$, the upper suspended table, D and its hangers $m^1$, and levers $d^1\ d^2\ d^3\ d^4$, the system of closely-placed long pins, lever M, the single registering-index pointer, and the compound scale, all substantially as set forth.

DAVID THOS. WINTER.

Witnesses:
PENNINGTON HALSTED,
CHARLES EARLE.